Patented May 4, 1954

2,677,679

UNITED STATES PATENT OFFICE 2,677,679

QUATERNARY AMMONIUM POLYMERS OF THE ACRYLIC TYPE

Arthur L. Barney, Wilmington, Del., assignor to E. I. du Pont de Nemours and Company, Wilmington, Del., a corporation of Delaware No Drawing. Application March 21, 1951, Serial No. 216,839

4 Claims. (Cl. 260—85.5)

This invention relates to polymers and more particularly to polymers of monoethylenically unsaturated quaternary ammonium compounds.

Polymeric materials which may be employed in solution to give films and fibers of high strength have achieved considerable importance in recent years. For example, acrylonitrile polymers acquired importance for such uses when a suitable solvent was found. The preparation of polymers which have good solubility as well as functional groups that contribute to receptivity toward dyestuffs or can be further modified would be of considerable utility. Polymeric quaternary ammonium compositions also have utility in the preparation of ion exchange products which are of use for the purification of water, separation of ionic materials, and in the construction of film where layers of selected pH sensitivity are required.

This invention has as an object the preparation of polymers and copolymers. Another object is a process for the preparation of polymers having quaternary ammonium groups. Other objects will appear hereinafter.

These objects are accomplished by the process of this invention wherein a compound having but one non-aromatic carbon-carbon unsaturation and that in a vinylidene, $CH_2=C<$, group attached to the carbonyl carbon of a —CO—O—alkylene-radical the other free valence of which radical is attached to a quaternary ammonium group is polymerized at a temperature within the range 20–100° C. with the aid of, as an initiator, a free radical generating polymerization catalyst, preferably in an aqueous solution.

The following examples in which parts are by weight are illustrative of the invention.

EXAMPLE I

*Preparation of acrylonitrile/β-methacryloxyethyltrimethylammonium sulfate copolymer*

The methiodide (3.5 parts) obtained from the reaction of dimethylaminoethyl methacrylate with methyl iodide was dissolved in water and treated with excess silver sulfate solution. The precipitated silver iodide was filtered off and the aqueous solution of the quaternary sulfate mixed with 34.5 parts of acrylonitrile, 0.19 part of ammonium persulfate and 0.33 part of sodium bisulfite in a total of 500 parts of water. The pH of the solution was adjusted to 3.3 with sulfuric acid.

The polymerization was started at 25° C. and allowed to warm spontaneously to 40° C. at which temperature it was maintained for two hours. The polymer (11.2 parts) was obtained after filtration, washing and drying. A film of the polymer cast from dimethylformamide solution showed good receptivity to acid dyes.

EXAMPLE II

*Copolymerization of acrylonitrile with methacryloxyethyltrimethylammonium methylsulfate*

Mixtures of 450 parts distilled water, 0.24 part of thiourea, 0.65 part of dodecyl mercaptan, 33.0 parts of acrylonitrile, 0.95 part of 30% hydrogen peroxide solution and 2.9 parts and 1.47 parts, respectively, of β-methacryloxyethyltrimethylammonium methylsulfate, in aqueous solution were allowed to polymerize at pH 3.5 for 24 hours at 25° C. Polymers were obtained in 42% yield and 59% yield, respectively, after the usual filtration, washing and drying. Films cast from dimethylformamide solution showed good receptivity to acid dyes. The polymers showed inherent viscosities of 0.60 and 3.00, respectively.

EXAMPLE III

A mixture of 9.5 parts of styrene, 1.0 part of β-methacryloxyethyltrimethylammonium p-toluenesulfonate, (from β-dimethylaminoethyl methacrylate and methyl p-toluenesulfonate), 0.3 part of a dispersing agent, 100 parts of water and 0.06 part of α,α'-azodiisobutyramidine hydrochloride was heated under an atmosphere of nitrogen in a closed glass vessel for four hours at 60° C. Washing the product with methanol gave 1.6 parts of a white solid which was not toluene soluble, which could be pressed to a film at 170° C., and which contained 0.26% nitrogen corresponding to 6.4% by weight of the quaternary compound.

EXAMPLE IV

A mixture of 9.5 parts of methyl acrylate, 1.2 parts of β-methacryloxyethyltrimethylammonium p-toluene-sulfonate, 0.3 part of a dispersing agent, 100 parts of water and 0.07 part of α,α'-azodiisobutyramidine hydrochloride was heated for four hours at 60° C. under an atmosphere of nitrogen in a closed glass vessel. The white gelatinous mass which resulted after trituration with boiling carbon tetrachloride gave on drying at 76° C./1mm., 7.3 parts of white polymer containing 0.17% N amounting to 4.1% by weight of the quaternary monomer.

EXAMPLE V

A mixture of 10 parts of β-methacryloxyethyltrimethylammonium p-toluenesulfonate, 50 parts of water and 0.03 part of α,α'-azodiisobutyramidine hydrochloride was heated under an atmosphere of nitrogen for 20 hours at 63° C. Treatment of the resulting solution with a large volume of dioxane gave eight parts of a free-flowing, hygroscopic white powder. The inherent viscosity of a 0.1823% solution of the polymer in water at 25° C. was determined to be 6.04.

The polymerizable monoethylenically unsaturated vinylidene quaternary ammonium compounds that may be polymerized and copolymerized by the process of this invention are compounds having but one non-aromatic carbon-carbon unsaturation and that in a vinylidene, $CH_2=C<$, group directly attached to a polyatomic negative group, i. e., an electron attractive group (including acylous groups), any such negative group attached to the vinylidene group through a carbon atom contiguous to the vinylidene group having a multiple bond on said carbon, said vinylidene group being also mediately attached to a quaternary ammonium salt group.

Exemplary quaternary ammonium monomers which can be polymerized or copolymerized by the process of this invention include β-methacryloxyalkyltrialkylammonium sales, e. g., trialkylammoniumethyl methacrylic ester salts, e. g., trimethylammoniumethyl methacrylate chloride. These quaternary ammonium monomers are generally obtained from monoethylenically unsaturated vinylidene monomers containing a tertiary amine group. The more useful monomers have the general formula

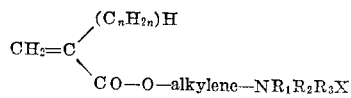

wherein $n$ is a cardinal number of 0-4, including the hydrogen, methyl and butyl groups, and the amino substituents, $R_1$, $R_2$, and $R_3$ are generally hydrocarbon free from non-aromatic unsaturation having a total of 3 to 12 carbons and preferably of 3 to 9 carbons. Particularly useful are the lower (1 to 4 carbon) alkyls. The monovalent anion X is salt-forming and is generally halide, e. g., chloride, sulfate, e. g., methyl sulfate anion, and sulfonate, e. g., para-toluene or cyclohexyl sulfonate anion.

The quaternary ammonium compounds are obtained by reaction of the tertiary amine with a hydrocarbon ester of an inorganic acid wherein the hydrocarbon radical has its free valence stemming from aliphatically saturated carbon. In general it is more convenient to have the one vinylidene unsaturation in the teritiary amine and to use an alkylating agent, e. g., an akyl halide or sulfate as the quaternizing agent. The hydrocarbon in the quaternizing agent is preferably lower alkyl, i. e., an alkyl of 1 to 4 carbons. Examples of such esters are alkyl halides, e. g., methyl iodide, butyl bromide, ethyl chloride; alkyl sulfates, e. g., methyl sulfate; alkyl sulfonates, e. g., ethyl p-toluene sulfonate; alkyl phosphates, e. g., triethyl phosphate; alkyl phosphites, e. g., triethyl phosphite; etc.

The polymerization and copolymerizations of this invention are preferably conducted in a hydroxylated solvent in which the monomeric material, catalyst and diluent are uniformly dispersed. Although water is generally satisfactory, other hydroxyl containing solvents that are useful are monohydric alcohols, particularly those of 1 to 4 carbons, e. g., tertiarybutanol.

The time and temperature required for substantial amount of polymerization to take place are dependent upon the monomers and catalyst employed. Suitable temperatures are of the order of 20-100° C. Times from one to twenty-four hours are customarily employed.

The polymerization catalyst employed is a free-radical type catalyst. Suitable catalysts are the peroxygen compounds such as potassium persulfate or benzoyl peroxide, azo compounds having the azo, —N=N—, group acyclic joined to discrete non-aromatic carbons at least one of which is a tertiary carbon in turn joined to carbon whose remaining valences are satisfied by oxygen and/or nitrogen (as in U. S. 2,471,959) such as azodiisobutyronitrile, combinations of thiourea with hydrogen peroxide, a bromate with a bisulfite, hydrogen peroxide with a titanous salt, etc. Various of the latter type catalyst systems are effective in aqueous media at relatively low temperatures, e. g., 0-40° C. The amount of catalyst employed is generally small, e. g., 0.01-5% by weight of the polymerizable monomers.

Although homopolymers of certain of the quaternary salts may be prepared by the process of this invention, copolymers with other polymerizable vinylidene compounds possess greater utility in view of the combination of physical properties along with the properties imparted by the quaternary compound.

The process of this invention is of advantage in that the reaction is clean and readily carried out under normal conditions of heat and pressure whereas the after-quaternization of a tertiary amino polymer does not result in complete quaternization.

The quaternary ammonium monomers can be polymerized alone, in admixture with one or more other such monomers or with one or more other polymerizable vinylidene compounds, i. e., those having a terminal methylene including olefins, e. g., ethylene; acrylyl and methacrylyl compounds, e. g., acrylonitrile, methyl acrylate, methacrylic esters and methacrylamide; vinyl and vinylidene halides, e. g., vinyl and vinylidene chloride;; vinyl carboxylates, e. g., vinyl acetate; other vinyl derivatives such as styrene and methyl vinyl ketone; and dienes such as chlorobutadiene and butadiene.

Usually the amount of the quaternary vinylidene compound present in the polymer is proportional to the amount employed in the polymerization. The amount of quaternary employed is at least 1% and the amount present in the polymer including copolymer is at least 0.1% and generally at least 1%.

The polymers of this invention have increased solubility and reactivity with various modifiers, e. g., they have increased dye absorption.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of polymers wherein a monomer composition consisting of monomers having a non-aromatic carbon-carbon unsaturation and that ethylenic at least 0.1% of which is a monomer of the formula

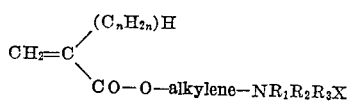

wherein $n$ is a cardinal number of 0 to 4, $R_1$, $R_2$, and $R_3$ are hydrocarbon, free from non-aromatic unsaturation and having a total of 3 to 12 carbons and X is a monovalent salt-forming anion, is brought into contact with a free radical type polymerization catalyst in uniform dispersion in a hydroxylated solvent for the quaternary ammonium monomer.

2. A process for the preparation of polymers wherein a monomer composition consisting of monomers having a non-aromatic carbon-carbon unsaturation and that ethylenic at least 0.1% of which is a methacryloxyalkyltrialkylammonium salt is brought into contact with a free radical type polymerization catalyst in uniform dispersion in a hydroxylated solvent for the quaternary ammonium monomer.

3. Process of claim 2 wherein the polmerization is conducted in aqueous dispersion.

4. Process in claim 3 wherein the monomer composition contains at least 85% acrylonitrile and 1–15% of the quaternary ammonium monomer.

References Cited in the file of this patent

UNITED STATES PATENTS

| Number | Name | Date |
| --- | --- | --- |
| 2,491,471 | Arnold | Dec. 20, 1947 |
| 2,567,836 | Anthes | Sept. 11, 1951 |
| 2,572,560 | Ham | Oct. 23, 1951 |
| 2,572,561 | Ham | Oct. 23, 1951 |

OTHER REFERENCES

Butler et al., J. Am. Chem. Soc., 71, 3120–3122, (1949).

Butler and Goette: J. Am. Chem Soc., 74, pages 1939 et seq., April 20, 1952 (abstract of the University of Florida M. S. thesis of Goette; thesis date December 8, 1950).